(12) United States Patent
Watson et al.

(10) Patent No.: US 12,065,899 B2
(45) Date of Patent: *Aug. 20, 2024

(54) WELL OPERATIONS WITH GROUPED PARTICLE DIVERTER PLUG

(71) Applicant: THRU TUBING SOLUTIONS, INC., Oklahoma City, OK (US)

(72) Inventors: Brock W. Watson, Sadler, TX (US); Gary P. Funkhouser, Moore, OK (US); Roger L. Schultz, Newcastle, OK (US)

(*) Notice: Subject to any disclaimer, the term of this patent is extended or adjusted under 35 U.S.C. 154(b) by 465 days.

This patent is subject to a terminal disclaimer.

(21) Appl. No.: 17/093,802

(22) Filed: Nov. 10, 2020

(65) Prior Publication Data

US 2021/0054715 A1 Feb. 25, 2021

Related U.S. Application Data

(63) Continuation of application No. 16/267,565, filed on Feb. 5, 2019, now Pat. No. 10,871,049.

(51) Int. Cl.
| | |
|---|---|
| *E21B 33/13* | (2006.01) |
| *C09K 8/42* | (2006.01) |
| *E21B 33/12* | (2006.01) |
| *E21B 33/05* | (2006.01) |

(52) U.S. Cl.
CPC .......... *E21B 33/1208* (2013.01); *C09K 8/426* (2013.01); *E21B 33/1204* (2013.01); *E21B 33/13* (2013.01); *E21B 33/05* (2013.01)

(58) Field of Classification Search
CPC ....... E21B 33/13; E21B 33/134; E21B 33/138
See application file for complete search history.

(56) References Cited

U.S. PATENT DOCUMENTS

| | | |
|---|---|---|
| 3,376,934 A | 4/1968 | Willman et al. |
| 3,437,147 A | 4/1969 | Davies |
| 4,187,909 A | 2/1980 | Erbstoesser |
| | (Continued) | |

FOREIGN PATENT DOCUMENTS

| | | |
|---|---|---|
| GB | 2484166 A | 4/2012 |

OTHER PUBLICATIONS

GCC Examination Report issued Apr. 13, 2021 for GCC Patent Application No. GC 2020-38975, 4 pages.
(Continued)

*Primary Examiner* — Giovanna Wright
(74) *Attorney, Agent, or Firm* — Smith IP Services, P.C.

(57) ABSTRACT

A method can include deploying a diverter plug into a well, the diverter plug comprising a group of particles that are prevented from dispersing, flowing fluid, thereby conveying the diverter plug into engagement with a fluid passageway, the particles conforming to a shape of the fluid passageway as the diverter plug blocks fluid flow through the fluid passageway, and the particles being prevented from dispersing while the diverter plug blocks the fluid flow through the fluid passageway. The diverter plug can include a group of particles disposed within an outer enclosure. The particles in the enclosure can conform to a shape of the fluid passageway as the diverter plug blocks fluid flow through the fluid passageway. In another method, the enclosure can sealingly engage the fluid passageway while the particles remain disposed within the enclosure.

14 Claims, 17 Drawing Sheets

(56) References Cited

U.S. PATENT DOCUMENTS

| | | | |
|---|---|---|---|
| 4,924,811 A | 5/1990 | Axelrod | |
| 5,253,709 A | 10/1993 | Kendrick et al. | |
| 5,908,073 A | 6/1999 | Nguyen et al. | |
| 8,307,916 B1 | 11/2012 | Wald | |
| 10,871,049 B2 * | 12/2020 | Watson | E21B 33/1204 |
| 2007/0107908 A1 | 5/2007 | Vaidya et al. | |
| 2007/0169935 A1 | 7/2007 | Akbar et al. | |
| 2010/0152070 A1 | 6/2010 | Ghassemzadeh | |
| 2012/0181032 A1 | 7/2012 | Naedler et al. | |
| 2012/0285695 A1 | 11/2012 | Lafferty et al. | |
| 2014/0332203 A1 | 11/2014 | Meinke et al. | |
| 2016/0145969 A1 | 5/2016 | O'Malley et al. | |
| 2016/0319628 A1 | 11/2016 | Schultz et al. | |
| 2017/0275965 A1 | 9/2017 | Watson et al. | |

OTHER PUBLICATIONS

Danish Office Action issued Dec. 2, 2020 for DK Patent Application No. PA 2020 70072, 8 pages.
Danish Examination Report issued Mar. 5, 2021 for DK Patent Application No. PA 2020 70072, 3 pages.
Office Action issued May 14, 2020 for U.S. Appl. No. 16/267,565, 16 pages.
Office Action issued Aug. 21, 2020 for U.S. Appl. No. 16/267,565, 9 pages.
Canadian Examination Report issued Jan. 21, 2021 for CA Patent Application No. 3,062,695, 3 pages.

\* cited by examiner

WELL OPERATIONS WITH GROUPED PARTICLE DIVERTER PLUG

CROSS-REFERENCE TO RELATED APPLICATION

This application is a continuation of prior application Ser. No. 16/267,565 filed on 5 Feb. 2019. The entire disclosure of this prior application is incorporated herein by this reference.

BACKGROUND

This disclosure relates generally to equipment utilized and operations performed in conjunction with a subterranean well and, in an example described below, more particularly provides a grouped particle diverter plug for use in well operations.

It can be beneficial to be able to control how and where fluid flows in a well. For example, it may be desirable in some circumstances to be able to prevent fluid from flowing into a particular formation zone. As another example, it may be desirable in some circumstances to cause fluid to flow into a particular formation zone, instead of into another formation zone. Therefore, it will be readily appreciated that improvements are continually needed in the art of controlling fluid flow in wells.

DETAILED DESCRIPTION

Figure 1:
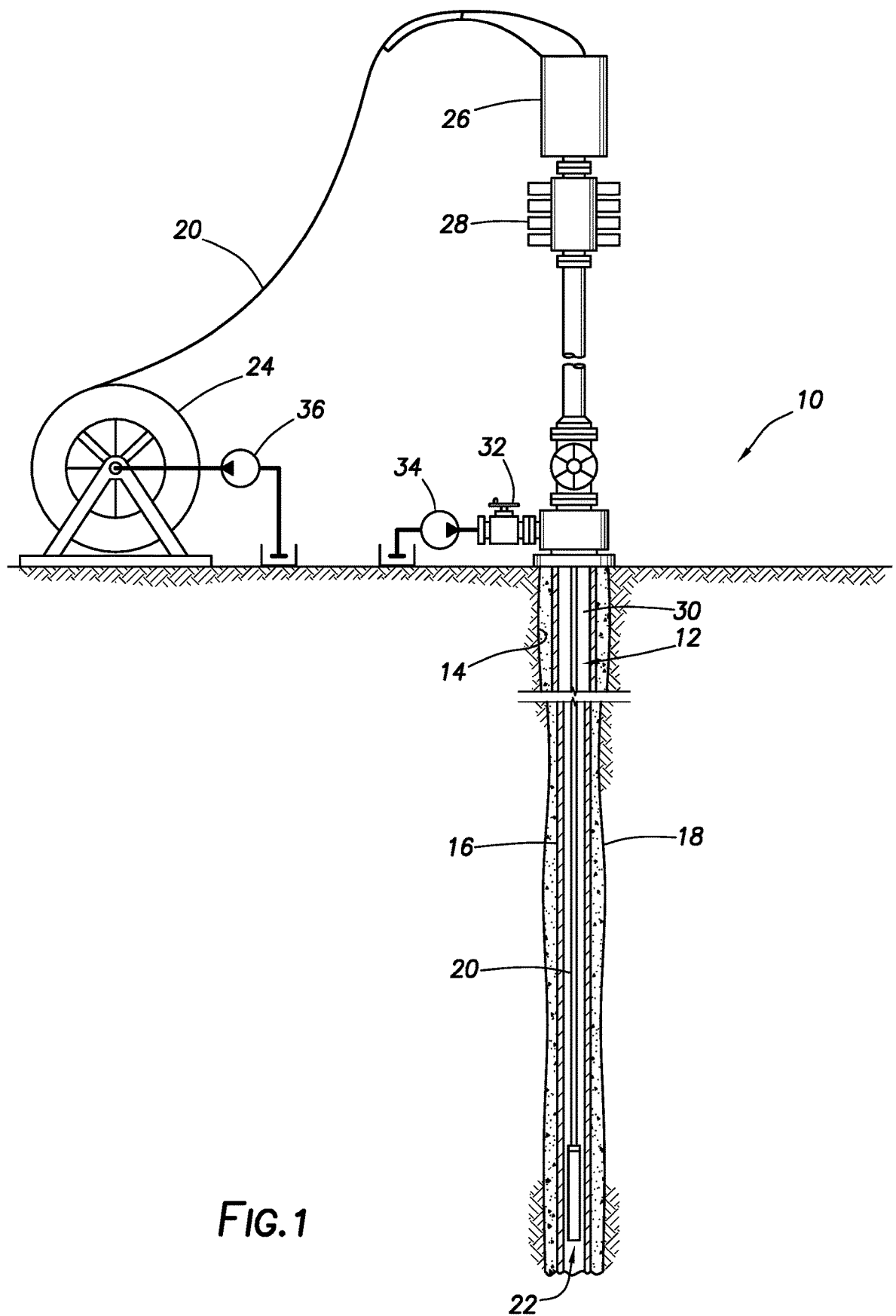
FIG. 1 is a representative partially cross-sectional view of an example of a well system and associated method which can embody principles of this disclosure.

Representatively illustrated in FIG. 1 is a system 10 for use with a well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is conveyed into a wellbore 14 lined with casing 16 and cement 18. Although multiple casing strings would typically be used in actual practice, for clarity of illustration only one casing string 16 is depicted in the drawings.

Although the wellbore 14 is illustrated as being vertical, sections of the wellbore could instead be horizontal or otherwise inclined relative to vertical. Although the wellbore 14 is completely cased and cemented as depicted in FIG. 1, any sections of the wellbore in which operations described in more detail below are performed could be uncased or open hole. Thus, the scope of this disclosure is not limited to any particular details of the system 10 and method.

The tubular string 12 of FIG. 1 comprises coiled tubing 20 and a bottom hole assembly 22. As used herein, the term "coiled tubing" refers to a substantially continuous tubing that is stored on a spool or reel 24. The reel 24 could be mounted, for example, on a skid, a trailer, a floating vessel, a vehicle, etc., for transport to a wellsite. Although not shown in FIG. 1, a control room or cab would typically be provided with instrumentation, computers, controllers, recorders, etc., for controlling equipment such as an injector 26 and a blowout preventer stack 28.

As used herein, the term "bottom hole assembly" refers to an assembly connected at a distal end of a tubular string in a well. It is not necessary for a bottom hole assembly to be positioned or used at a "bottom" of a hole or well.

When the tubular string 12 is positioned in the wellbore 14, an annulus 30 is formed radially between them. Fluid, slurries, etc., can be flowed from surface into the annulus 30 via, for example, a casing valve 32. One or more pumps 34 may be used for this purpose. Fluid can also be flowed to surface from the wellbore 14 via the annulus 30 and valve 32.

Fluid, slurries, etc., can also be flowed from surface into the wellbore 14 via the tubing 20, for example, using one or more pumps 36. Fluid can also be flowed to surface from the wellbore 14 via the tubing 20.

Figure 2A:
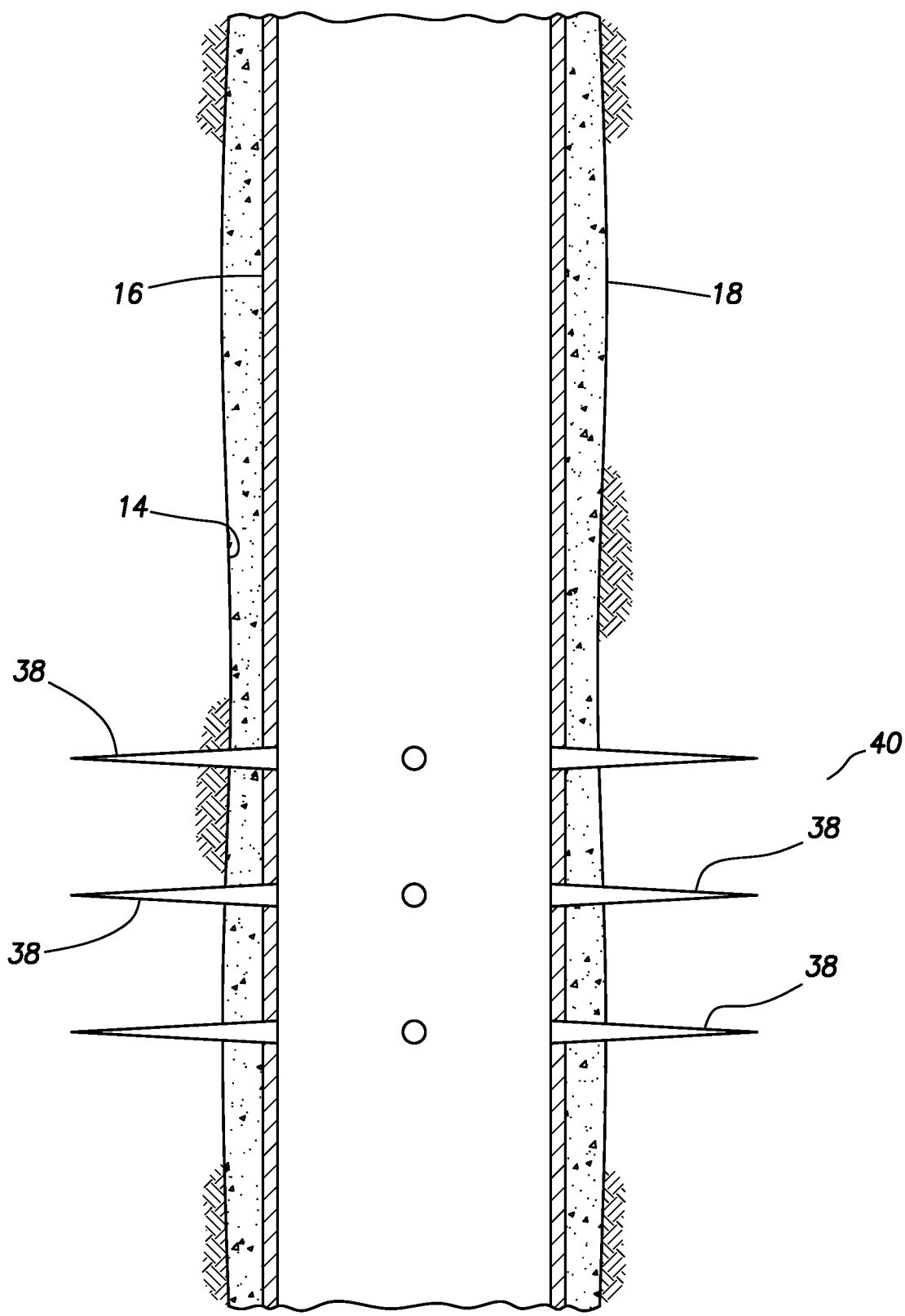
FIGS. 2A-D are enlarged scale representative partially cross-sectional views of steps in an example of a re-completion method that may be practiced with the system of FIG. 1.

In the further description below of the examples of FIG. 2A-, one or more grouped particle diverter plugs are used to block or plug openings in the system 10 of FIG. 1. However, it should be clearly understood that these methods and the diverter plug may be used with other systems, and the diverter plug may be used in other methods in keeping with the principles of this disclosure.

The example methods described below allow fluid passageways to be blocked permanently or temporarily in a variety of different applications. The diverter plugs are conveyed into leak paths using pumped fluid. In some examples, fibers, lines, ribbons, fabric, sheets or other material extending outwardly from a plug "finds" and follows the fluid flow, pulling the grouped particles of the plug into a restricted portion of a fluid passageway, causing the grouped particles, any outwardly extending material and any enclosure for the particles to become tightly wedged into the fluid passageway, thereby sealing off fluid communication through the fluid passageway.

Any or all components of the diverter plug can be made of degradable or non-degradable materials. The degradable materials can be either self-degrading, or can require degrading treatments, such as, by exposing the materials to certain acids, certain base compositions, certain chemicals, certain types of radiation (e.g., electromagnetic or "nuclear"), or elevated temperature. The exposure can be performed at a desired time using a form of well intervention, such as, by spotting or circulating a fluid in the well so that the material is exposed to the fluid.

In some examples, the material can be an acid degradable material (e.g., nylon, etc.), a mix of acid degradable material (for example, nylon fibers mixed with particulate such as calcium carbonate), self-degrading material (e.g., poly-lactic acid (PLA), poly-glycolic acid (PGA), etc.), material that degrades by galvanic action (such as, magnesium alloys, aluminum alloys, etc.), a combination of different self-degrading materials, or a combination of self-degrading and non-self-degrading materials.

Multiple materials can be pumped together or separately. For example, nylon and calcium carbonate could be pumped as a mixture, or the nylon could be pumped first to initiate a seal, followed by calcium carbonate to enhance the seal.

In certain examples described below, the diverter plug can be made of knotted fibrous materials. Multiple knots can be used with any number of loose ends. The ends can be frayed or un-frayed. The fibrous material can be rope, fabric, cloth or another woven or braided structure.

The diverter plug can be used to block open sleeve valves, perforations or any leak paths in a well (such as, leaking connections in casing, corrosion holes, etc.). Any opening through which fluid flows can be blocked with a suitably configured diverter plug.

In one example method described below, a well with an existing perforated zone can be re-completed. Diverter plugs (either degradable or non-degradable) are conveyed by flow to plug all existing perforations.

The well can then be re-completed using any desired completion technique. If the plugs are degradable, a degrading treatment can then be placed in the well to open up the plugged perforations (if desired).

In another example method described below, multiple formation zones can be perforated and fractured (or otherwise stimulated, such as, by acidizing) in a single trip of the bottom hole assembly 22 into the well. In the method, one zone is perforated, the zone is fractured or otherwise stimulated, and then the perforated zone is plugged using one or more plugs.

These steps are repeated for each additional zone, except that a last zone may not be plugged. All of the plugged zones are eventually unplugged by waiting a certain period of time (if the devices are self-degrading), by applying an appropriate degrading treatment, or by mechanically removing the plugs.

Referring specifically now to FIGS. 2A-D, steps in an example of a method in which the bottom hole assembly 22 of FIG. 1 can be used in re-completing a well are representatively illustrated. In this method (see FIG. 2A), the well has existing perforations 38 that provide for fluid communication between an earth formation zone 40 and an interior of the casing 16. However, it is desired to re-complete the zone 40, in order to enhance the fluid communication.

Figure 2B:
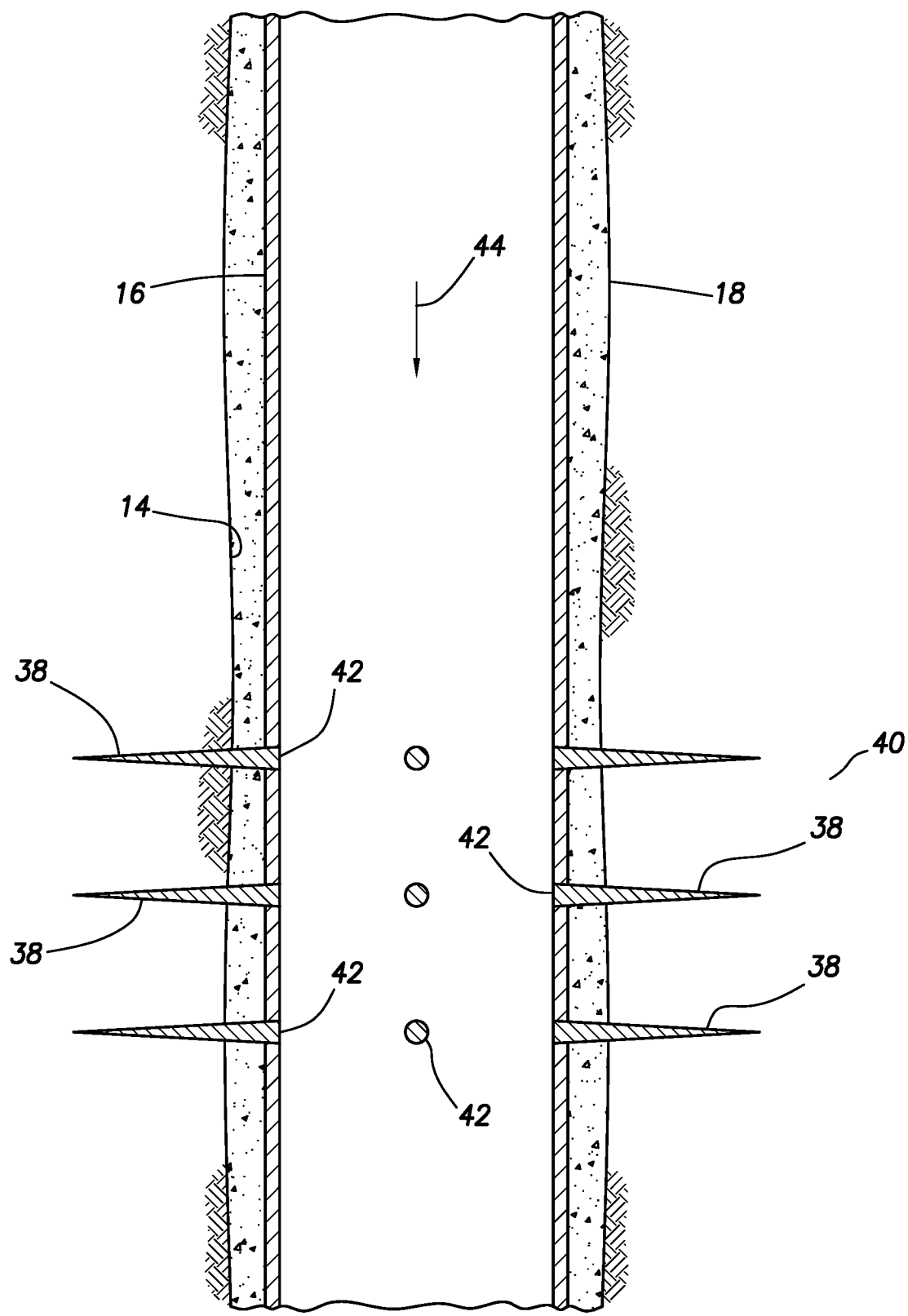

Referring additionally now to FIG. 2B, the perforations 38 are plugged, thereby preventing flow through the perforations into the zone 40. Plugs 42 in the perforations can be diverter plugs, as described more fully below. In that case, the plugs 42 can be conveyed through the casing 16 and into engagement with the perforations 38 by fluid flow 44.

Figure 2C:
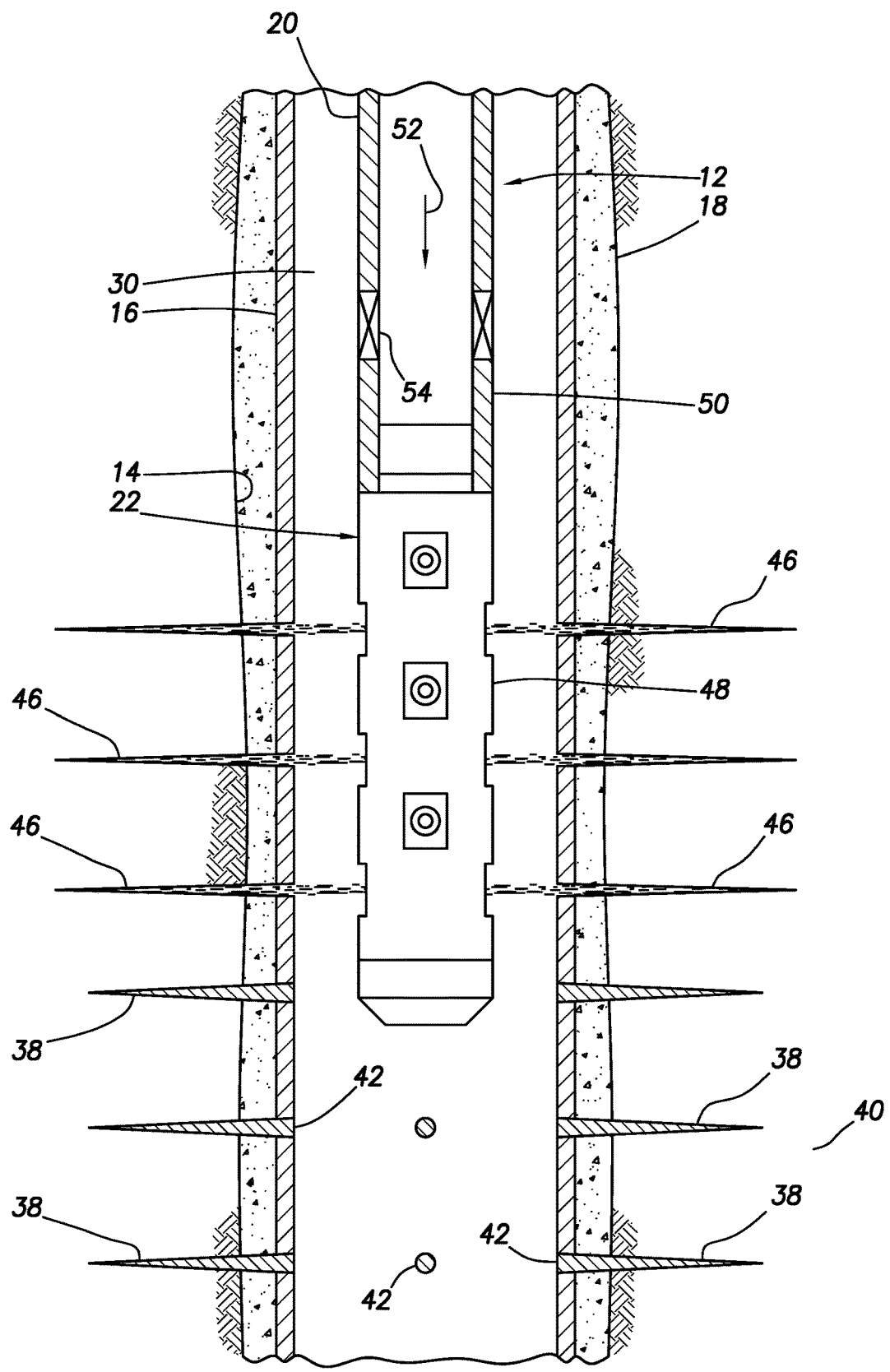

Referring additionally now to FIG. 2C, new perforations 46 are formed through the casing 16 and cement 18 by use of an abrasive jet perforator 48. In this example, the bottom hole assembly 22 includes the perforator 48 and a circulating valve assembly 50. Although the new perforations 46 are depicted as being formed above the existing perforations 38, the new perforations could be formed in any location in keeping with the principles of this disclosure.

Note that other means of providing perforations 46 may be used in other examples. Explosive perforators, drills, etc., may be used if desired. The scope of this disclosure is not limited to any particular perforating means, or to use with perforating at all.

The perforations 38, 46 are merely examples of a wide variety of different types of fluid passageways that may be effectively plugged using the principles of this disclosure. Other types of fluid passageways can include (but are not limited to) leak paths, valve sleeves, seats, other openings, etc. Thus, the scope of this disclosure is not limited to use of the diverter plugs 42 to plug perforations 38, 46 in a well treatment operation.

In the FIGS. 2A-D example, the circulating valve assembly 50 controls flow between the coiled tubing 20 and the perforator 48, and controls flow between the annulus 30 and an interior of the tubular string 12. Instead of conveying the plugs 42 into the well via flow 44 through the interior of the casing 16 (see FIG. 2B), in other examples the plugs could be deployed into the tubular string 12 and conveyed by fluid flow 52 through the tubular string prior to the perforating operation. In that case, a valve 54 of the circulating valve assembly 50 could be opened to allow the plugs 42 to exit the tubular string 12 and flow into the interior of the casing 16 external to the tubular string.

Figure 2D:
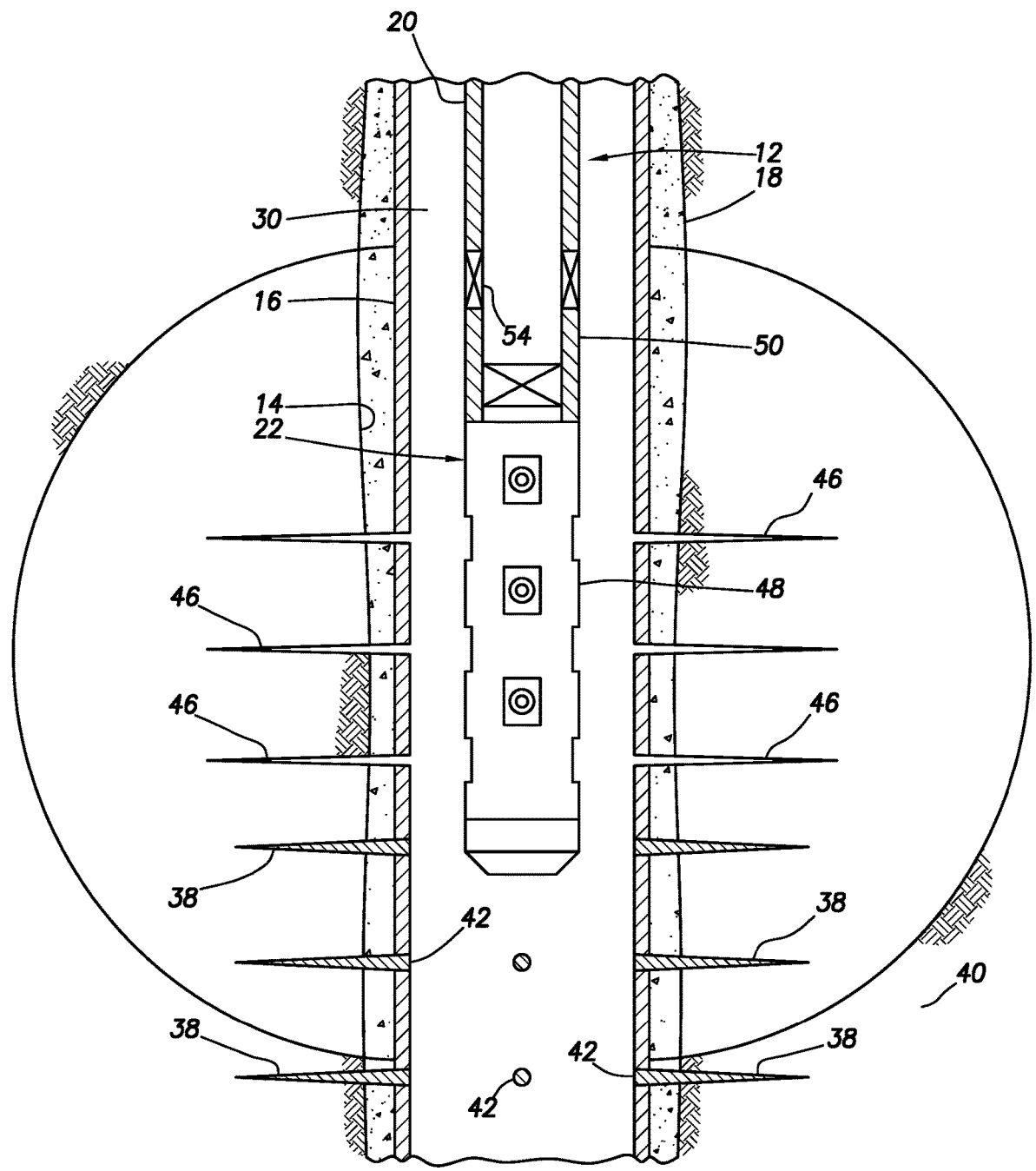

Referring additionally now to FIG. 2D, the zone 40 has been fractured or otherwise stimulated by applying increased pressure to the zone after the perforating operation. Enhanced fluid communication is now permitted between the zone 40 and the interior of the casing 16. Note that fracturing is not necessary in keeping with the principles of this disclosure.

In the FIG. 2D example, the plugs 42 prevent the pressure applied to stimulate the zone 40 via the perforations 46 from leaking into the zone via the perforations 38. The plugs 42 may remain in the perforations 38 and continue to prevent flow through the perforations, or the plugs may degrade, if desired, so that flow is eventually permitted through the perforations.

Referring additionally now to FIGS. 3A-D, steps in another example of a method in which the bottom hole assembly 22 of FIG. 1 can be used in completing multiple zones 40a-c of a well are representatively illustrated. The multiple zones 40a-c are each perforated and fractured during a single trip of the tubular string 12 into the well.

Figure 3A:
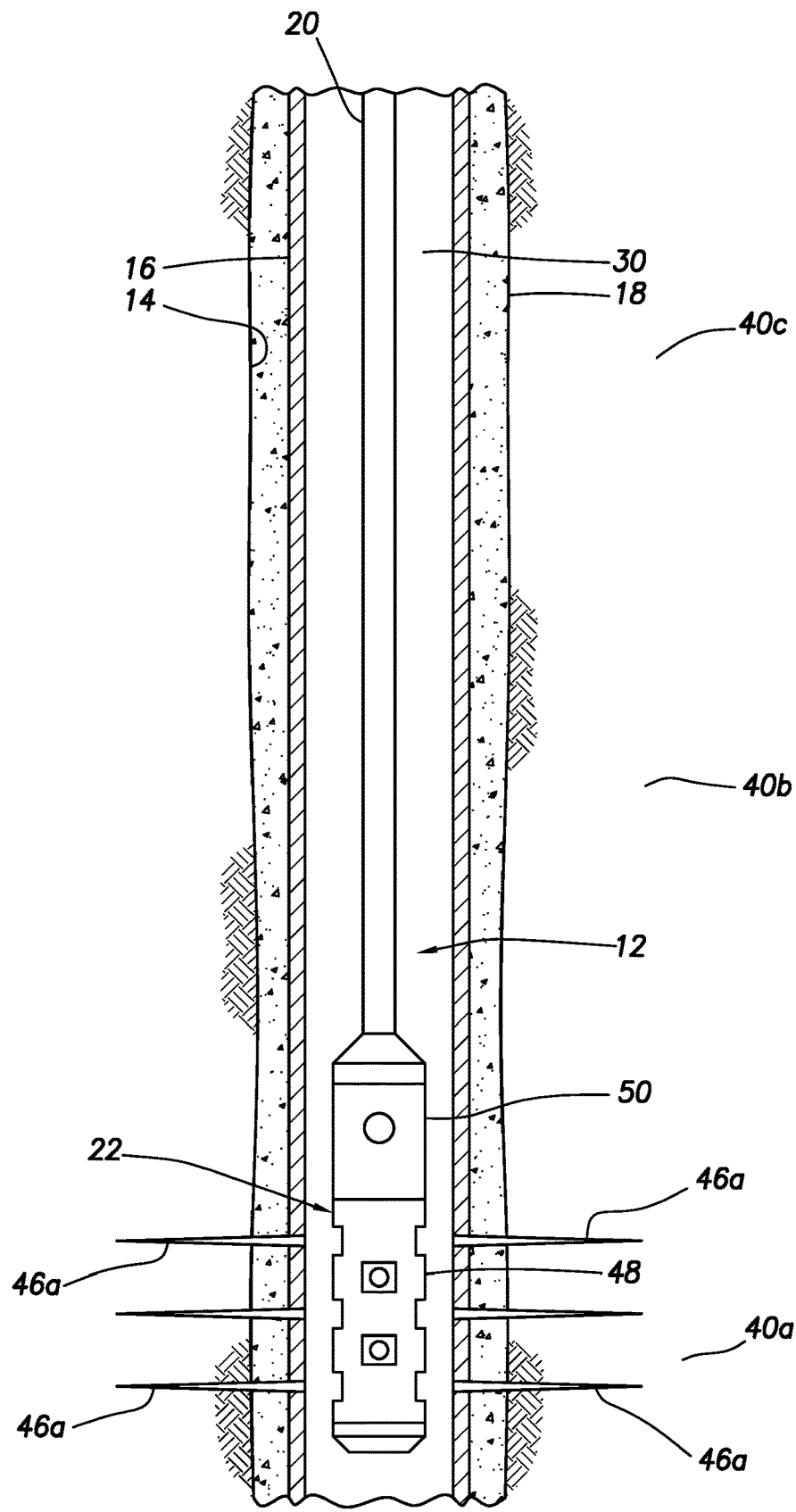
FIGS. 3A-D are representative partially cross-sectional views of steps in another example of a method that may be practiced with the system of FIG. 1.

In FIG. 3A, the tubular string 12 has been deployed into the casing 16, and has been positioned so that the perforator 48 is at the first zone 40a to be completed. The perforator 48 is then used to form perforations 46a through the casing 16 and cement 18, and into the zone 40a.

Figure 3B:
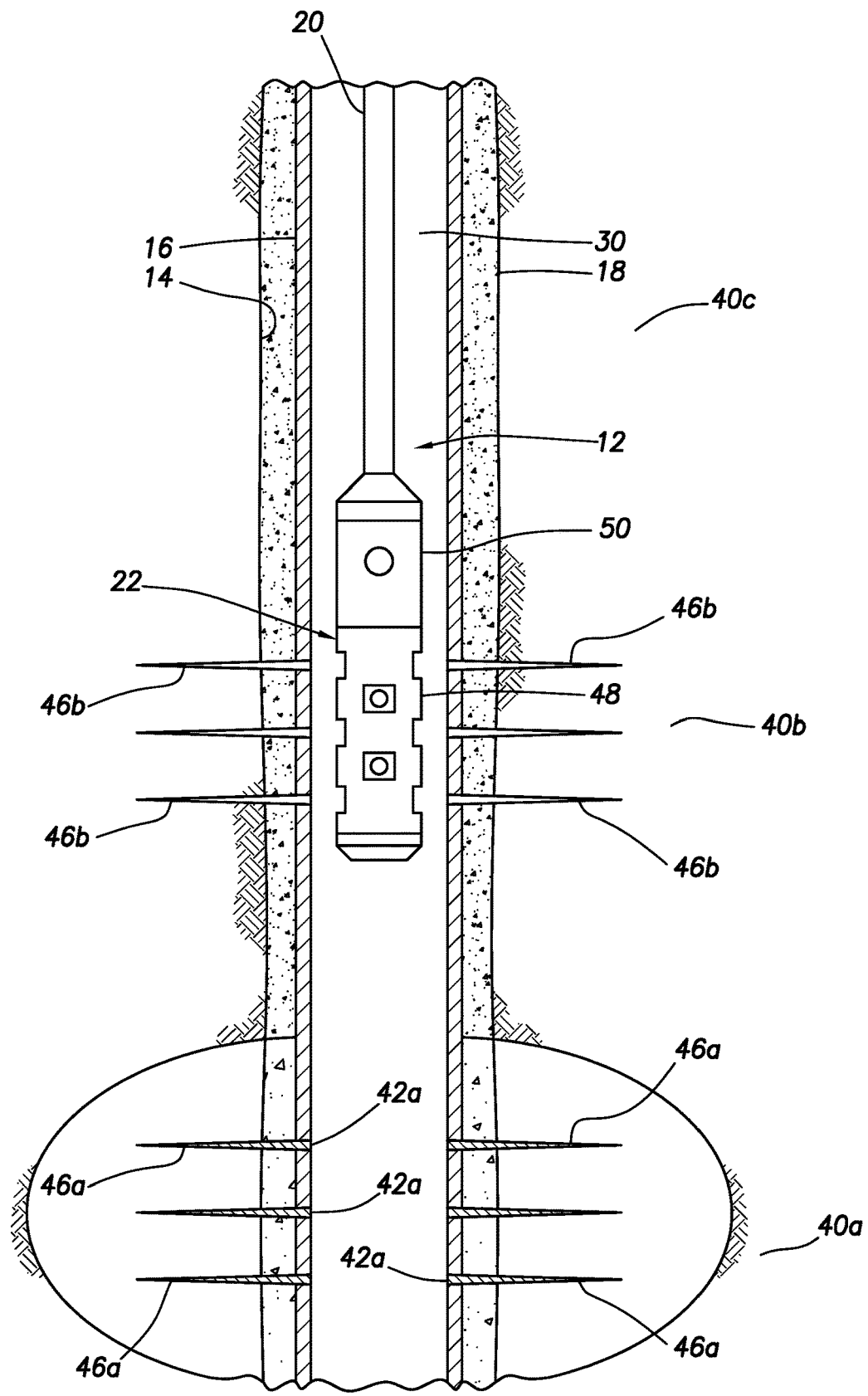

In FIG. 3B, the zone 40a has been fractured by applying increased pressure to the zone via the perforations 46a. The fracturing pressure may be applied, for example, via the annulus 30 from the surface (e.g., using the pump 34 of FIG. 1), or via the tubular string 12 (e.g., using the pump 36 of FIG. 1). The scope of this disclosure is not limited to any particular fracturing means or technique, or to the use of fracturing at all.

After fracturing of the zone 40a, the perforations 46a are plugged by deploying plugs 42a into the well and conveying them by fluid flow into sealing engagement with the perforations. The plugs 42a may be conveyed by flow 44 through the casing 16 (e.g., as in FIG. 2B), or by flow 52 through the tubular string 12 (e.g., as in FIG. 2C).

The tubular string 12 is repositioned in the casing 16, so that the perforator 48 is now located at the next zone 40b to be completed. The perforator 48 is then used to form perforations 46b through the casing 16 and cement 18, and into the zone 40b. The tubular string 12 may be repositioned before or after the plugs 42a are deployed into the well.

Figure 3C:
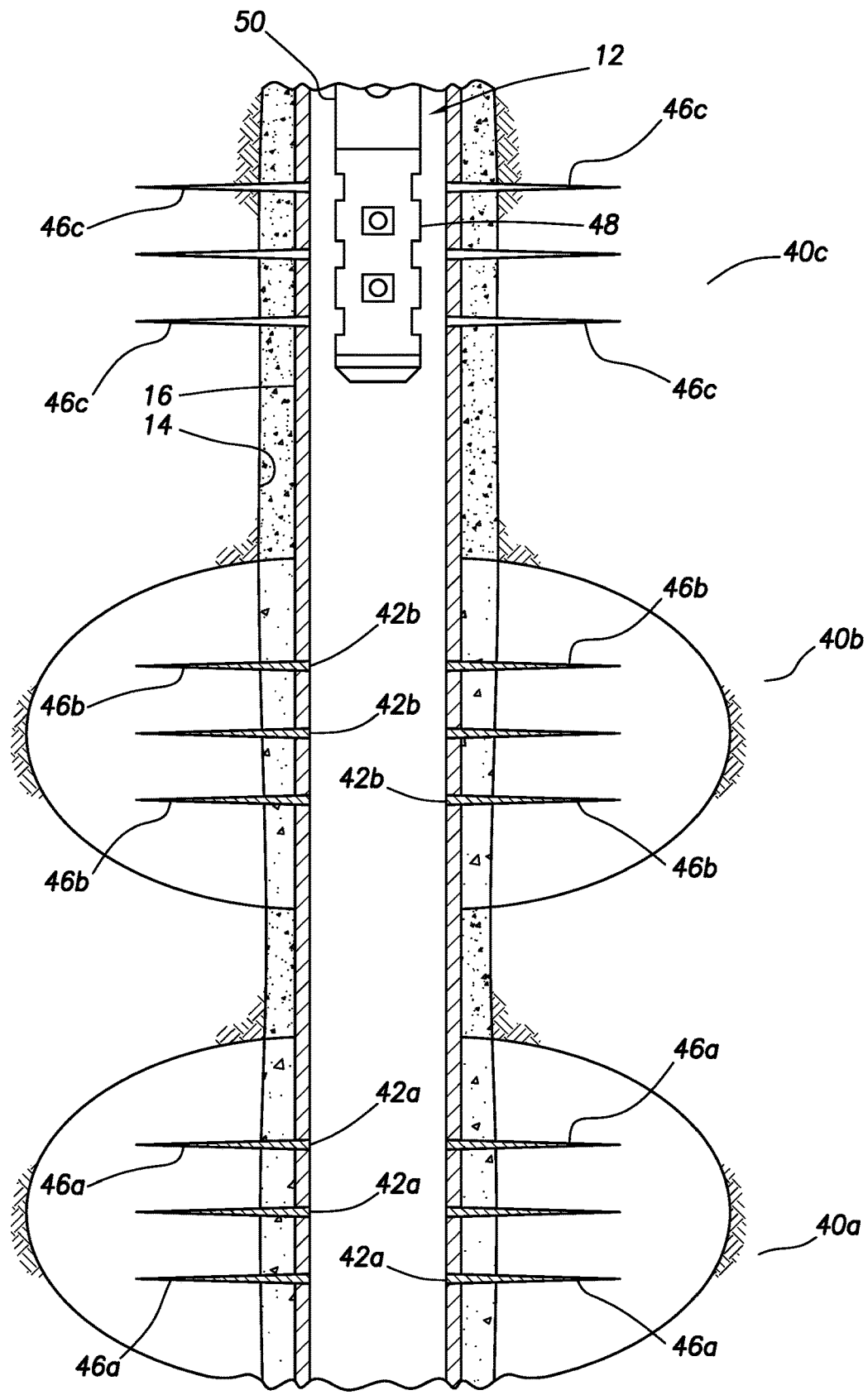

In FIG. 3C, the zone 40b has been fractured or otherwise stimulated by applying increased pressure to the zone via the perforations 46b. The pressure may be applied, for example, via the annulus 30 from the surface (e.g., using the pump 34 of FIG. 1), or via the tubular string 12 (e.g., using the pump 36 of FIG. 1).

After stimulation of the zone 40b, the perforations 46b are plugged by deploying plugs 42b into the well and conveying them by fluid flow into sealing engagement with the perforations. The plugs 42b may be conveyed by flow 44 through the casing 16, or by flow 52 through the tubular string 12.

The tubular string 12 is repositioned in the casing 16, so that the perforator 48 is now located at the next zone 40c to be completed. The perforator 48 is then used to form perforations 46c through the casing 16 and cement 18, and into the zone 40c. The tubular string 12 may be repositioned before or after the plugs 42b are deployed into the well.

Figure 3D:
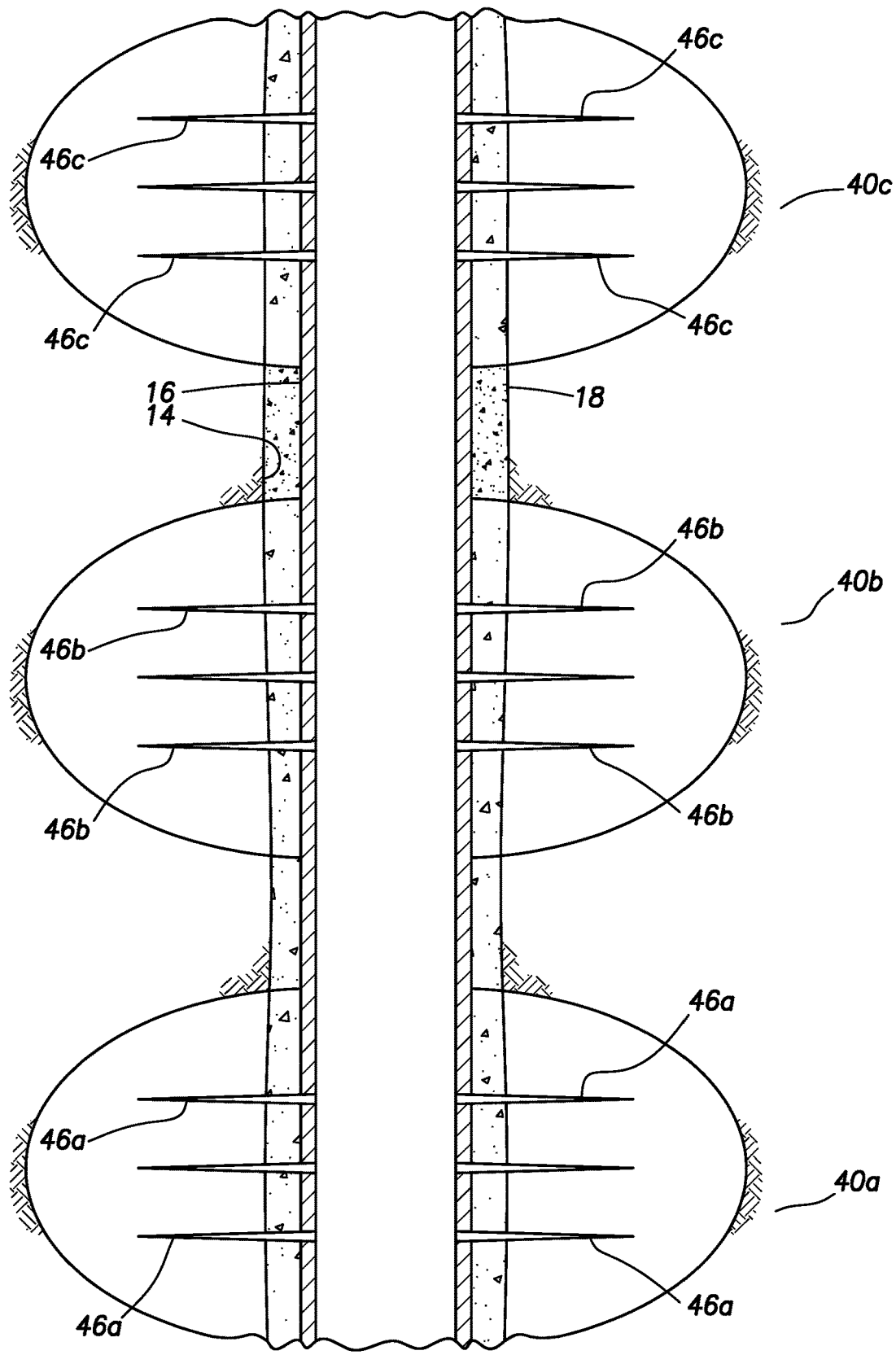

In FIG. 3D, the zone 40c has been fractured or otherwise stimulated by applying increased pressure to the zone via the perforations 46c. The pressure may be applied, for example, via the annulus 30 from the surface (e.g., using the pump 34 of FIG. 1), or via the tubular string 12 (e.g., using the pump 36 of FIG. 1).

After stimulation of the zone 40c, the perforations 46c could be plugged, if desired. For example, the perforations 46c could be plugged in order to verify that the plugs are properly blocking flow from the casing 16 to the zones 40a-c.

As depicted in FIG. 3D, the plugs 42a,b are degraded and no longer prevent flow through the perforations 46a,b. Thus, as depicted in FIG. 3D, flow is permitted between the interior of the casing 16 and each of the zones 40a-c.

The plugs 42a,b may be degraded in any manner. The plugs 42a,b may degrade in response to application of a degrading treatment, in response to passage of a certain period of time, or in response to exposure to elevated downhole temperature. The degrading treatment could include exposing the plugs 42a,b to a particular type of radiation, such as electromagnetic radiation (e.g., light having a certain wavelength or range of wavelengths, gamma rays, etc.) or "nuclear" particles (e.g., gamma, beta, alpha or neutron).

The plugs 42a,b may degrade by galvanic action or by dissolving. The plugs 42a,b may degrade in response to exposure to a particular fluid, either naturally occurring in the well (such as water or hydrocarbon fluid), or introduced therein.

The plugs 42a,b may be mechanically removed, instead of being degraded. The plugs 42a,b may be cut using a cutting tool (such as a mill or overshot), or an appropriately configured tool may be used to grab and pull the plugs from the perforations 46a,b.

Note that any number of zones may be completed in any order in keeping with the principles of this disclosure. The zones 40a-c may be sections of a single earth formation, or they may sections of separate formations.

Figure 4:
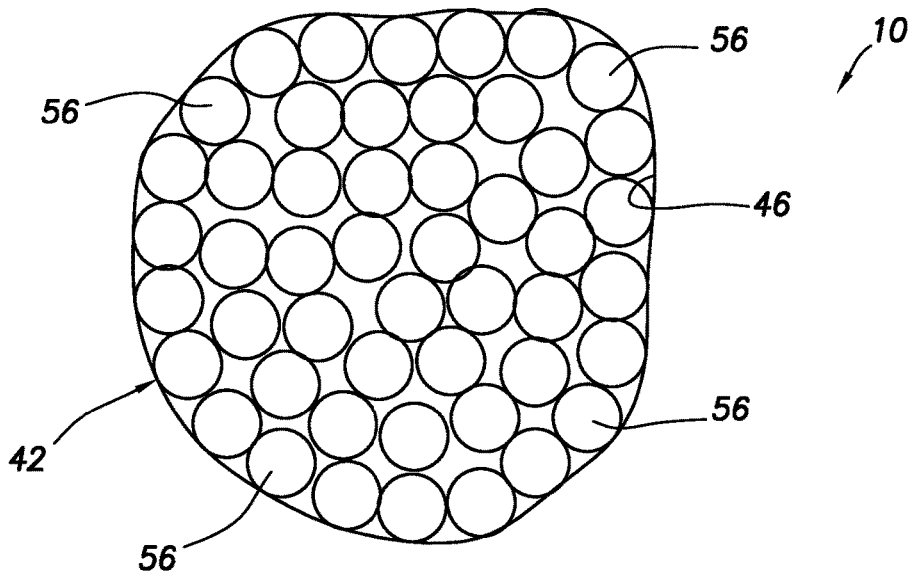
FIGS. 4-18 are representative views of examples of a diverter plug that may be used in the system and method examples of FIGS. 1-3D.

Referring additionally now to FIG. 4, an example of one of the perforations 46 in the system 10 is representatively illustrated. In this example, it may be seen that the perforation 46 has an irregular (in this case, non-circular) shape. It would be difficult for a single, solid plug to conform to the irregular shape of the perforation 46 for an effective seal between the plug and the perforation.

However, if the diverter plug 42 is made up of multiple particles 56, these particles can position themselves as needed to conform to the shape of the perforation 46. In some examples described below, the particles 56 are "loose" and can move relative to one another so that, collectively, the particles can conform to the shape of the perforation 46 or other fluid passageway. The particles 56 are grouped together, so that they do not disperse and instead remain as a group in the well.

The particles 56 may individually have any suitable shape. For example, the particles 56 may be shaped to enhance sliding displacement between adjacent particles by making the particles more rounded. Alternatively, or in addition, the particles 56 may be shaped so that they "lock together" when they have conformed to the shape of the fluid passageway being blocked (for example, the particles could have interlocking shapes, enhanced friction surfaces, etc.).

In some examples, the particles 56 may comprise, sand, rock chips, clay, thread, plastic pieces, spheres, polyhedrons, aggregate, fibers or other individual members made of any type of material and having any shape. The particles 56 may comprise mixtures of different materials or shapes.

The particles 56 are small relative to the perforation 46 or other fluid passageway the plug 42 is configured to engage. In some examples, a largest dimension (e.g., length or diameter) of a particle 56 is less than a smallest dimension (e.g., width or diameter) of the perforation 46 or other fluid passageway the plug 42 is configured to engage.

Figure 5:
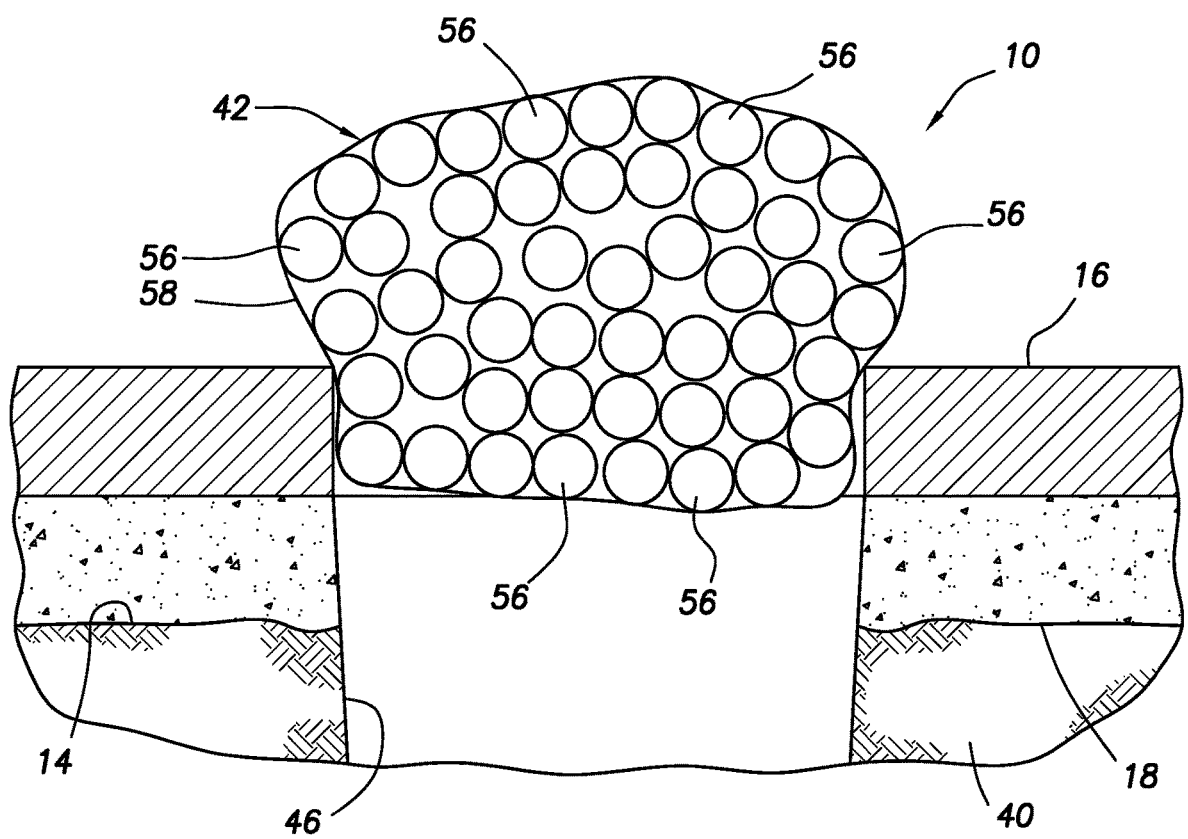

Referring additionally now to FIG. 5, an example of the diverter plug 42 is representatively illustrated in the system 10 as having engaged a perforation 46. The diverter plug 42 can entirely prevent fluid flow through the perforation 46, or can at least substantially block fluid flow through the perforation.

In this example, the perforation 46 is not irregular in shape, but the use of multiple particles 56 in the diverter plug 42 still allows the plug to conform to a shape of the perforation 46 where it enters the casing 16. Sealing engagement between the plug 42 and a periphery of the perforation 46 at an inner surface of the casing 16 can effectively prevent fluid flow into the perforation.

As depicted in FIG. 5, the particles 56 are contained within an enclosure 58. The enclosure 58 maintains the particles 56 in a coherent group, without allowing the particles to disperse in the well, both before and after the plug 42 engages the perforation 46.

The enclosure 58 may comprise a fabric, cloth, membrane, bag, foil, plastic, paper, cardboard, netting or other material suitable for containing the particles 56. The enclosure 58 can be closed by sewing, tape, glue, fusion, welding, riveting, magnetism, folding or other technique.

After the plug 42 has engaged the perforation 46, the particles 56 can provide structural support to the enclosures 58. For example, if the enclosure 58 sealingly engages the periphery of the perforation 46 at an inner surface of the casing 16 or an inner surface of the perforation, the particles 56 can maintain the enclosure in sealing contact. If the enclosure 58 is made of an impermeable material, the enclosure can prevent fluid flow through the grouped particles 56 while the plug 42 is engaged with the perforation 46.

Referring additionally now to FIGS. 6-18, examples of the diverter plug 42 are representatively illustrated. The diverter plugs 42 of FIGS. 4-18 may be used in the system 10 and method examples of FIGS. 1-3D, or they may be used in other systems and methods.

Figure 6:
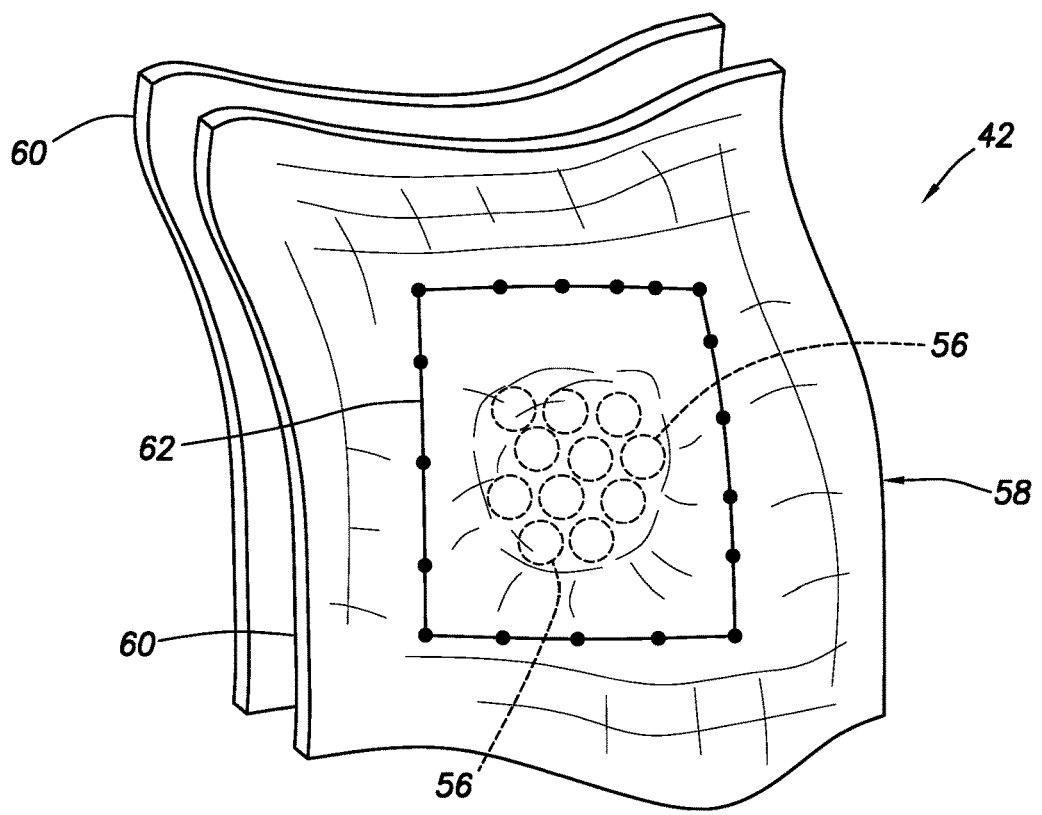

In the FIG. 6 example, the particles 56 are retained between two sheets of fabric 60. The particles 56 are contained in a pocket formed by stitching 62 the fabric 60 together.

The fabric 60 could be chosen for its strength and puncture resistance (e.g., KEVLAR™ material), or for its ability to sealingly engage the casing 16 or perforation 46. In other examples, the fabric 60 could instead be another type of sheet material (e.g., a rubber or synthetic material).

Figure 7:
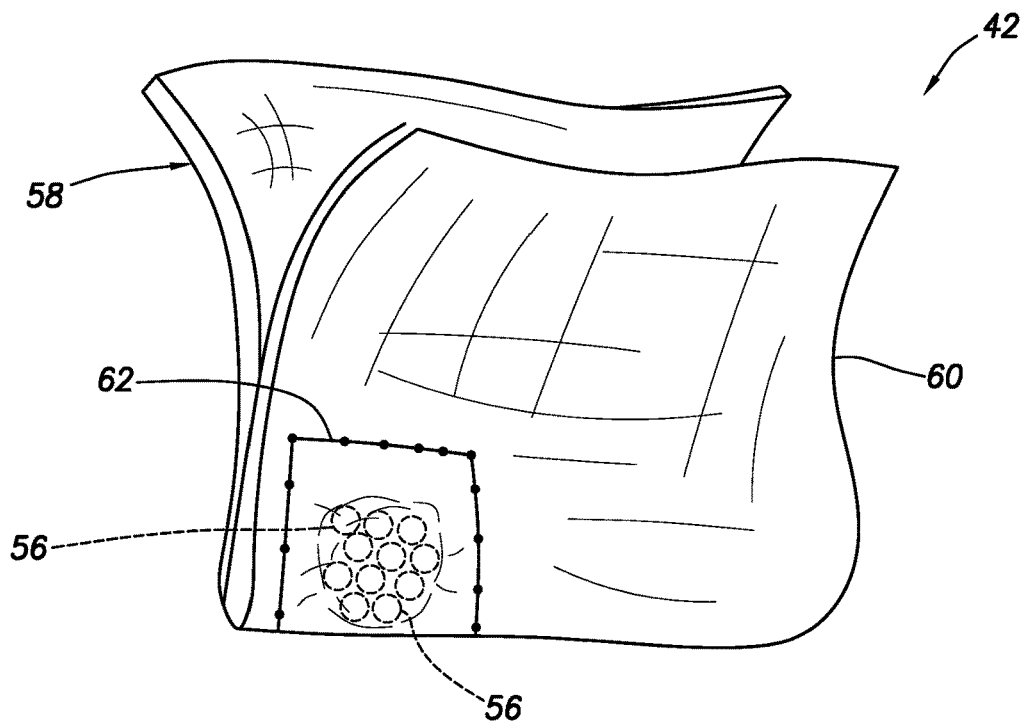

In the FIG. 7 example, the enclosure 58 comprises a single sheet of material (e.g., the fabric 60 or other sheet material). The sheet material is folded over, and the particles 56 are contained in a pocket formed on one side by the fold and otherwise bounded by the stitching 62.

In the FIGS. 6 & 7 examples, the fabric 60 extends outwardly from the pocket containing the particles 56. This fabric 60 can be used to enhance fluid drag on the plug 42, so that the plug is more effectively conveyed with the fluid flow to a perforation or other fluid passageway to be plugged. In the FIGS. 6 & 7 examples, the fabric 60 extending outwardly from the pocket containing the particles 56 could be slit to increase the fluid drag on the plug 42.

Figure 8:
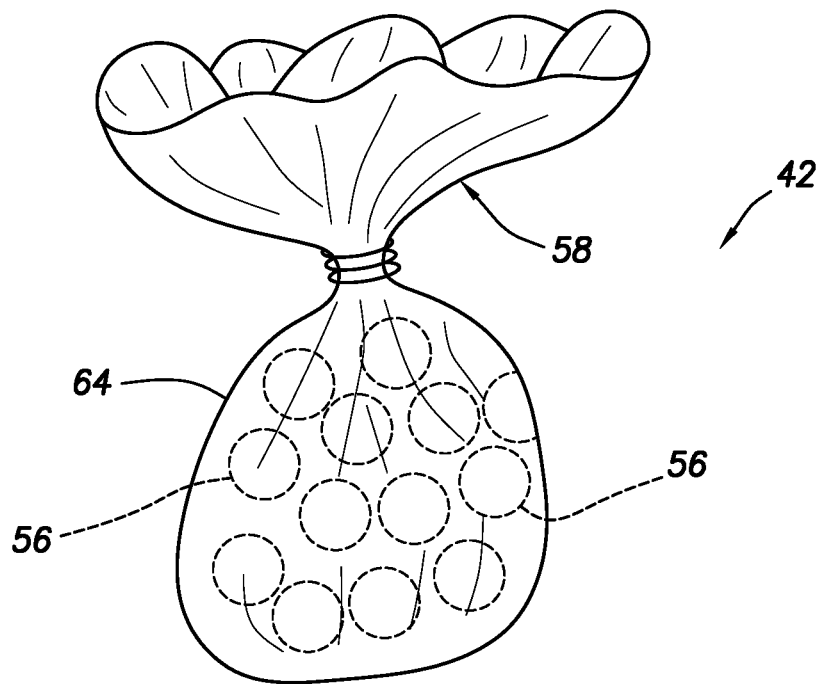
Figure 9:
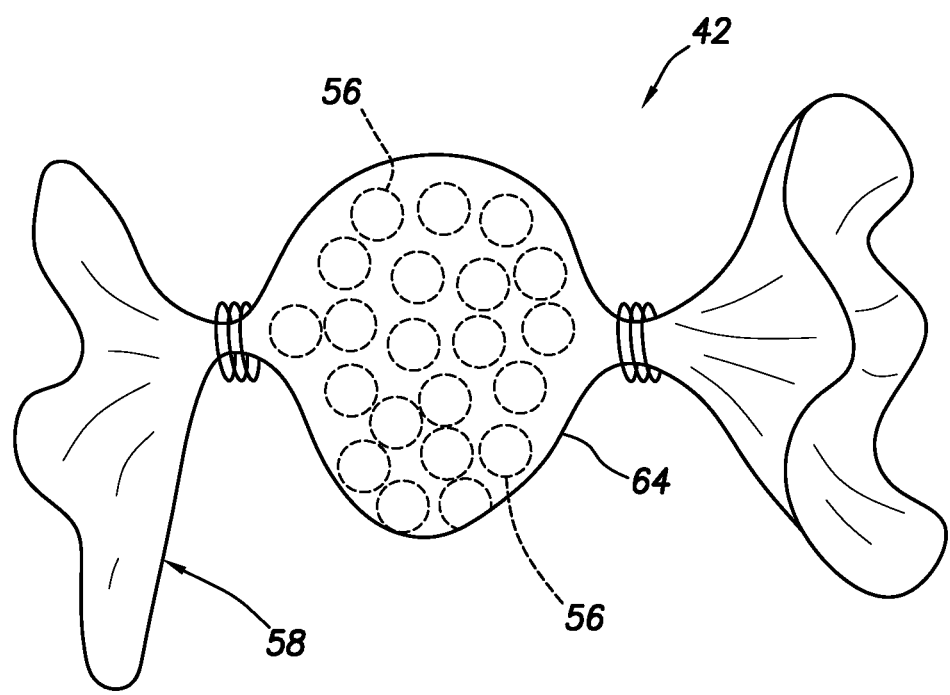

In the FIGS. 8 & 9 examples, the particles 56 are contained in an enclosure 58 comprising a sheet material 64 (such as, fabric, film, foil, cloth, composite, etc.). The particles 56 are enclosed within a pocket formed by gathering and tying one end (FIG. 8) or two opposite ends (FIG. 9) of the sheet material 64.

Figure 10:
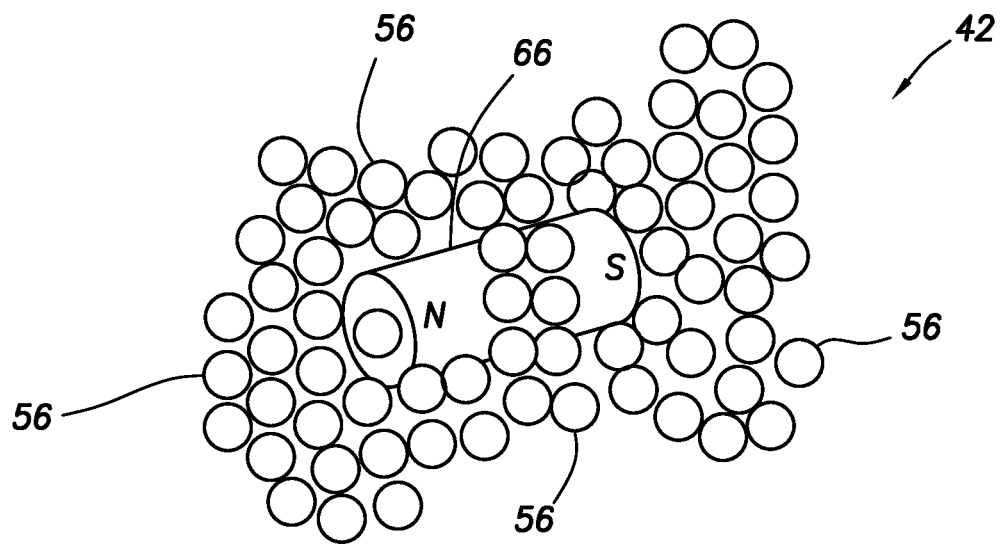

In the FIG. 10 example, the particles 56 are grouped together by magnetism. For example, the particles 56 could comprise a ferromagnetic material, and a magnet 66 could be used to attract the particles into a group. Alternatively, the particles 56 could themselves be magnetized, so that they are attracted to each other.

Figure 11:
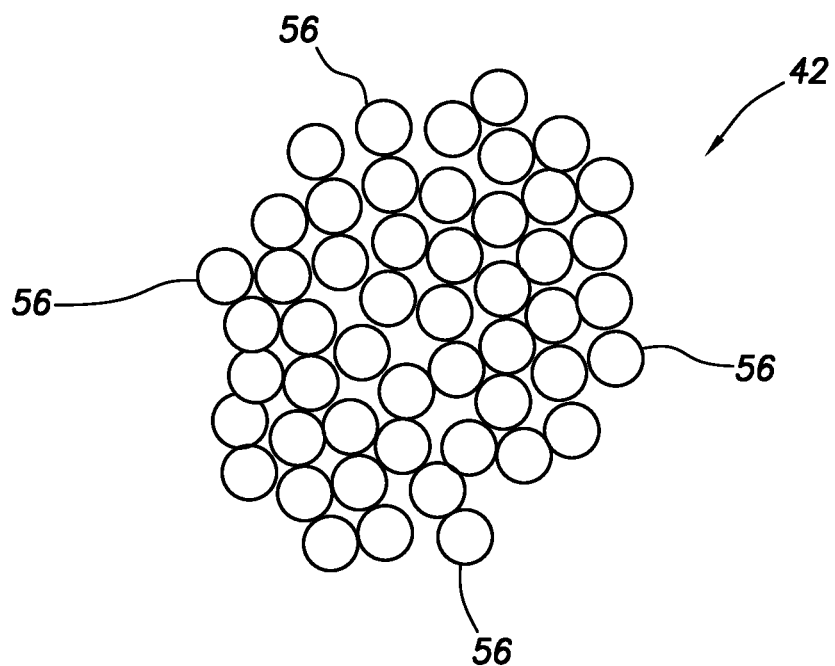

In the FIG. 11 example, the particles 56 are held together in a group by mechanical means. The particles 56 may be fused, glued, fastened, threaded or interlocked together.

Figure 12:
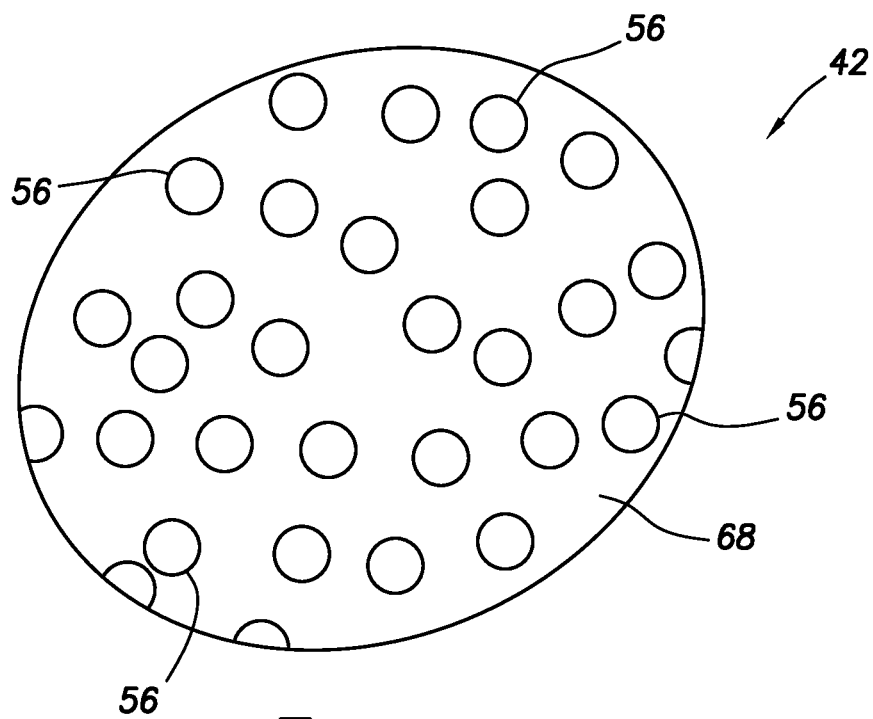

In the FIG. 12 example, the particles 56 are grouped together by embedding them in a deformable material 68 (such as, wax, clay, PLA, etc.). In other examples, the material 68 could be adhesive or have an adhesive coating thereon, with the particles 56 adhered to the material.

Figure 13:
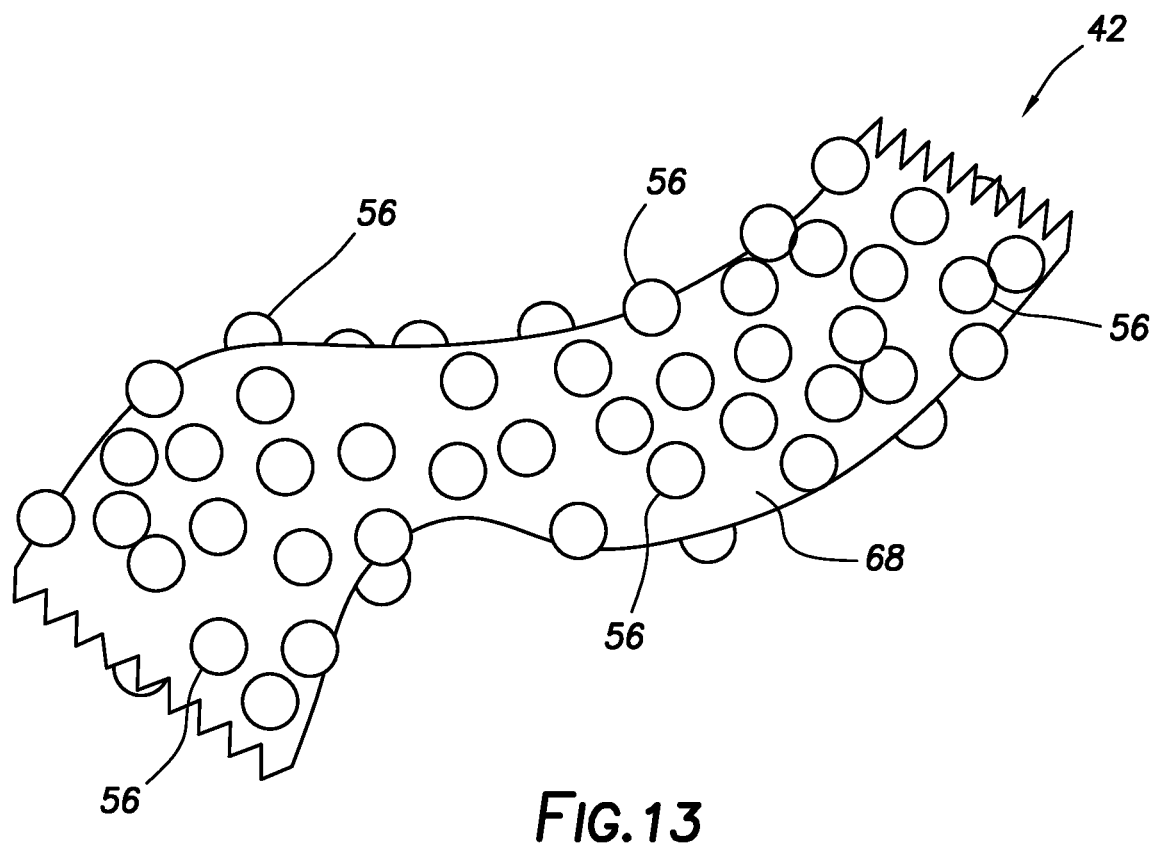

In the FIG. 13 example, the material 68 is in the form of an adhesive tape or film. The particles 56 are adhered to the material 68. The plug 42 could be rolled into a ball or wad prior to being deployed into a well.

Figure 14:
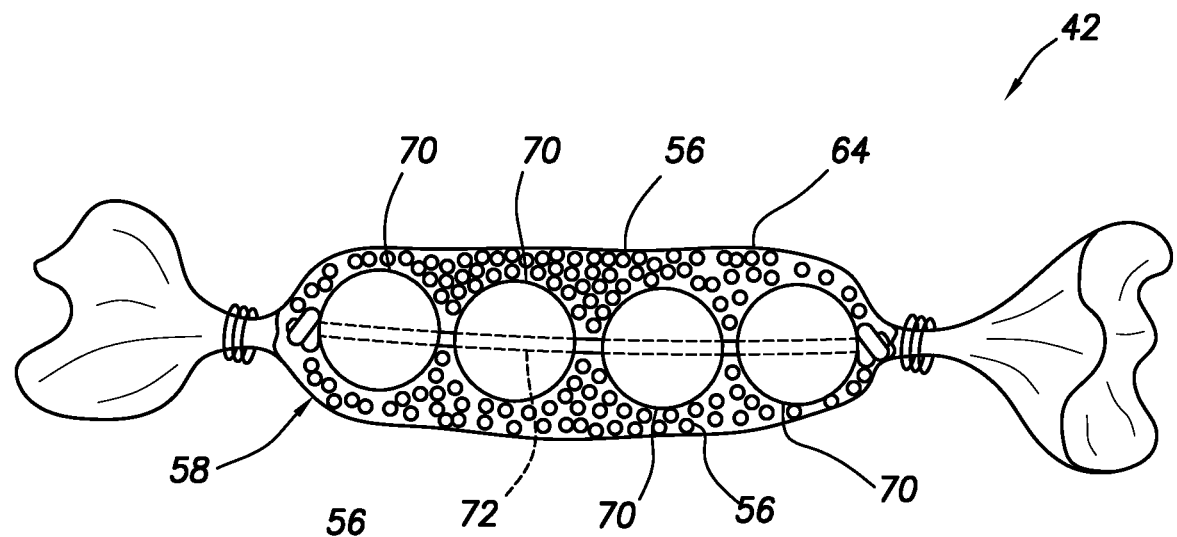

In the FIG. 14 example, the plug 42 is elongated. This shape may be advantageous for sealing off oblong or otherwise elongated slots or other fluid passageways in a well. For example, ports in casing valves or sliding sleeve valves are sometimes in the form of slotted openings, and are amenable to being blocked by an elongated plug, such as that depicted in FIG. 14.

The FIG. 14 plug 42 includes multiple enlarged bodies 70 with the particles 56 in the enclosure 64. The bodies 70 are "enlarged" in that they are larger than the particles 56 and, in some examples, each enlarged body 70 may be too large to pass through the fluid passageway to be plugged by the plug 42.

In the FIG. 14 example, the enlarged bodies 70 are secured to each other by a tether or line 72. The line 72 may be a rope, cable, string or other type of line capable of suitably securing and arranging the enlarged bodies 70.

Figure 15:
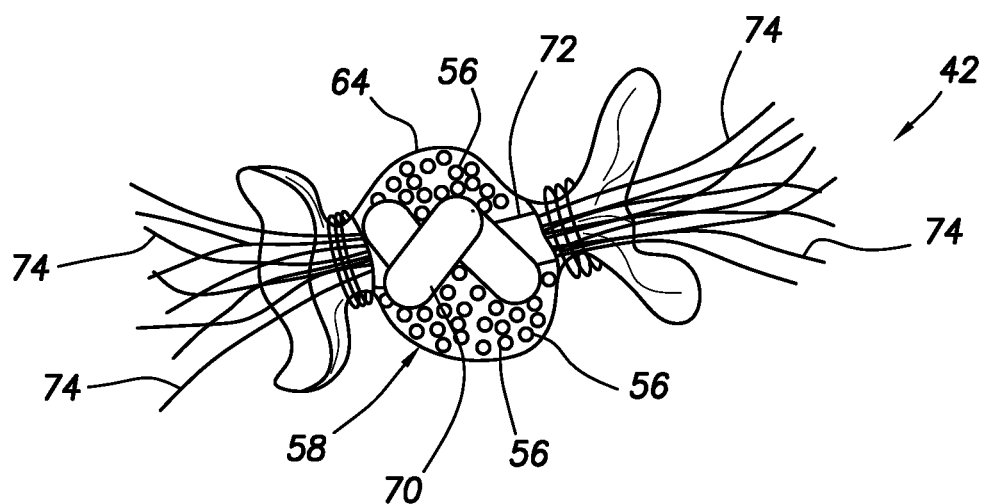

In the FIG. 15 example, the enlarged body 70 is in the form of a knot tied in the line 72. The knot is disposed with the particles 56 within the enclosure 58.

Ends of the lines 72 extend outwardly through gathered ends of the sheet material 64. The ends of the lines 72 may comprise splayed fibers 74, which can enhance the fluid drag on the plug 42 as it is being conveyed with fluid flow in the well.

Figure 16:
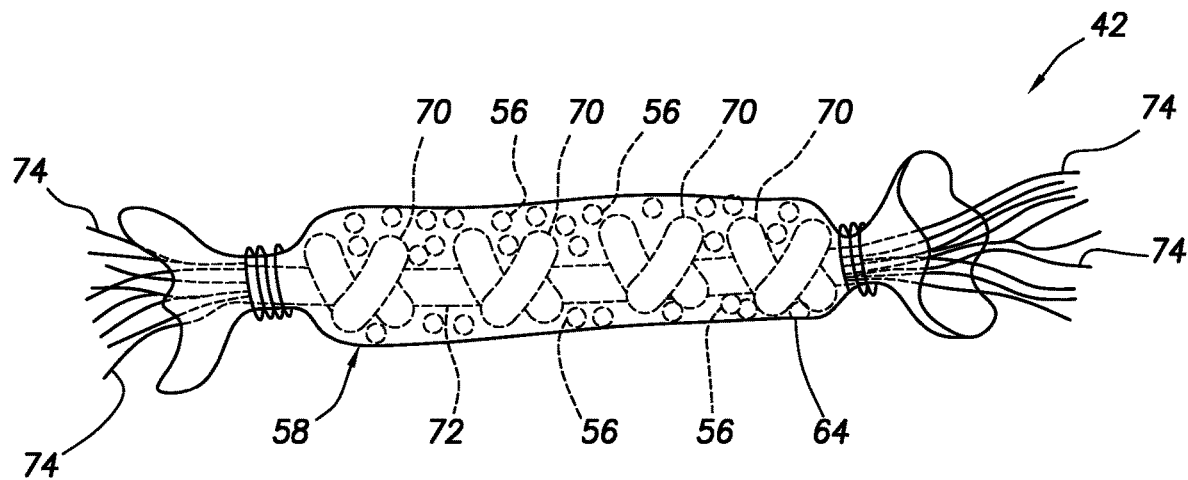

In the FIG. 16 example, there are multiple knots (enlarged bodies 70) tied along the line 72 in the enclosure 58. The lines 72, including the fibers 74 extend outwardly through the gathered ends of the sheet material 64.

Figure 17:
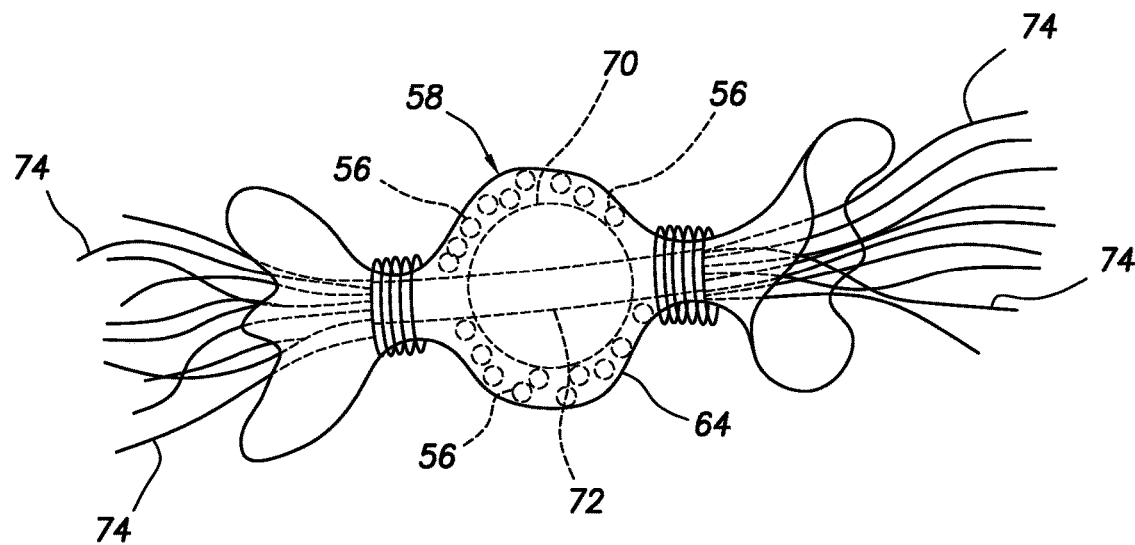

In the FIG. 17 example, the line 72 passes through the enlarged body 70 (which is spherical shaped). The lines 72, including the fibers 74 extend outwardly through the gathered ends of the sheet material 64.

Figure 18:
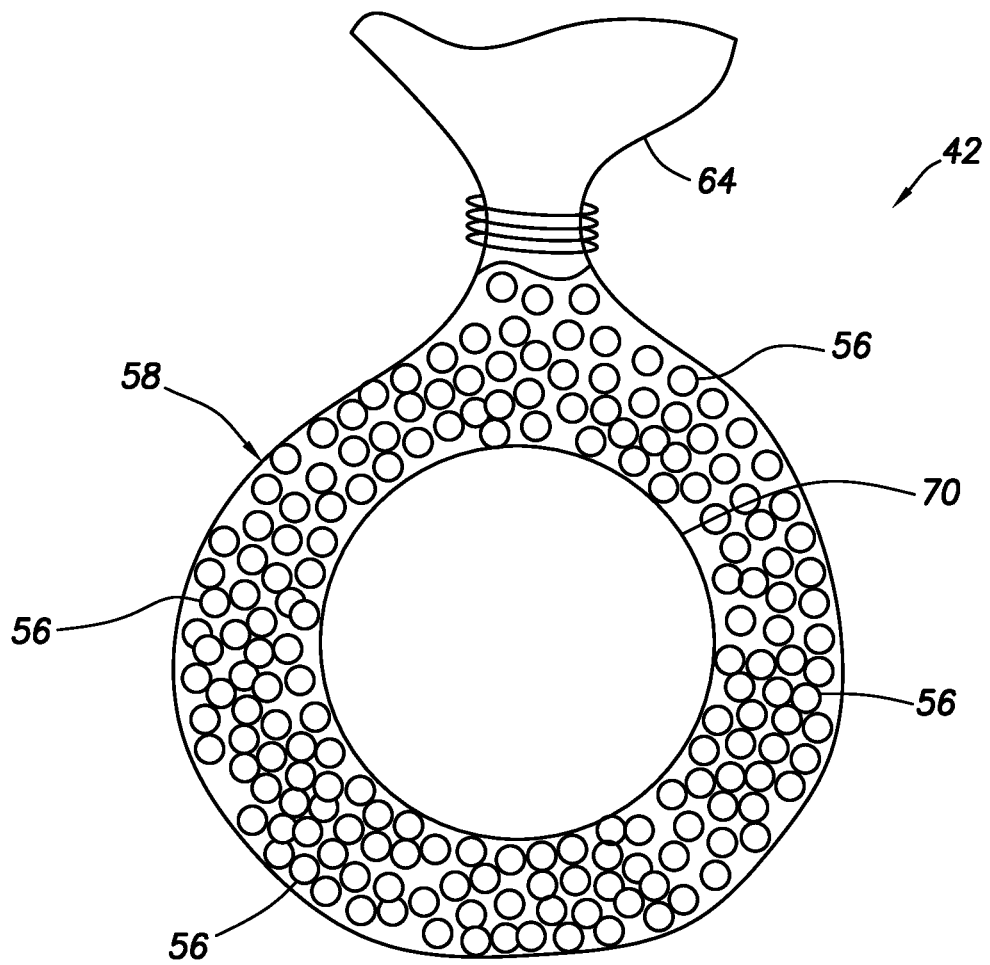

In the FIG. 18 example, the enlarged body 70 is disposed with the particles 56 in the enclosure 58. The material 64 at one end of the enclosure 58 is gathered together and tied, so that the particles 56 and the enlarged body 70 are contained together.

In any of the FIGS. 14-18 examples, the particles 56 and the enlarged body 70 may be loose and free to move relative to each other in the enclosure 58. The particles 56 can fill gaps between the enlarged body 70 and an irregularly shaped perforation or other fluid passageway. The particles 56 can be positioned between the enlarged body 70 and the enclosure 58 while the enclosure is engaged with the perforation or other fluid passageway.

It may now be fully appreciated that the above disclosure provides significant advancements to the art of controlling fluid flow in a well. In examples described above, an effective diverter plug 42 is described for use in systems and methods in which a fluid passageway is to be plugged by conveying the plug with fluid flow to the fluid passageway.

The above disclosure provides to the art a method. In one example, the method can comprise: deploying at least one diverter plug 42 into the well, the diverter plug 42 comprising a group of particles 56 disposed within an outer enclosure 58; flowing fluid 44, 52 in the well, thereby conveying the diverter plug 42 into engagement with a fluid passageway (e.g., perforation 46) in the well; and the particles 56 in the enclosure 58 conforming to a shape of the fluid passageway 46 as the diverter plug 42 blocks fluid flow 44, 52 through the fluid passageway 46.

In any of the examples described herein, the method may include the particles 56 degrading in the well.

In any of the examples described herein, the method may include the enclosure 58 degrading in the well.

In any of the examples described herein, during the deploying step, the particles 56 may be loose within the enclosure 58.

In any of the examples described herein, the conveying step may include producing fluid drag on material 64 extending outwardly from the diverter plug 42. The material 64 may be selected from the group consisting of fiber 74, line 72, fabric 60, sheet 64 and ribbon.

In any of the examples described herein, the method may include the enclosure 58 sealingly engaging the fluid passageway 46.

In any of the examples described herein, the particles 56 may be enclosed in the enclosure 58 while the enclosure 58 sealingly engages the fluid passageway 46.

In any of the examples described herein, the enclosure 58 may comprise at least one fabric sheet 60, 64, and the method may include stitching the particles 56 into the fabric sheet 60, 64.

In any of the examples described herein, the enclosure 58 may comprise a flexible sheet material 64, and the method may include retaining the particles 56 in the flexible sheet material 64.

In any of the examples described herein, the diverter plug 42 may comprise at least one enlarged body 70 disposed in the enclosure 58.

In any of the examples described herein, the conforming step may include the particles 56 occupying a space between the enclosure 58 and the enlarged body 70.

In any of the examples described herein, the at least one enlarged body 70 can comprise multiple enlarged bodies 70.

In any of the examples described herein, the method can include securing the multiple enlarged bodies 70 to each other in the enclosure 58.

In any of the examples described herein, the enlarged body 70 can comprise a knot formed in a line 72.

In any of the examples described herein, at least one of the line 72 and fibers 74 of the line 72 extends outwardly from the enclosure 58.

In any of the examples described herein, a line 72 may extend through the enlarged body 70.

Another method is provided to the art by this disclosure. In one example, the method can comprise: deploying at least one diverter plug 42 into the well, the diverter plug 42 comprising a group of particles 56 disposed within an outer enclosure 58; flowing fluid 44, 52 in the well, thereby conveying the diverter plug 42 into engagement with a fluid passageway (such as the perforation 46) in the well; and the enclosure 58 sealingly engaging the fluid passageway 46 while the particles 56 remain disposed within the enclosure 58.

In any of the examples described herein, the sealingly engaging step may comprise the particles 56 in the enclosure 58 conforming to a shape of the fluid passageway 46 as the diverter plug 42 blocks fluid flow through the fluid passageway 46. The conforming step may comprise the particles 56 occupying a space between the enclosure 58 and an enlarged body 70 in the enclosure 58.

Another method provided to the art by the above disclosure can comprise: deploying at least one diverter plug 42 into the well, the diverter plug 42 comprising a group of particles 56, the particles 56 being prevented from dispersing; flowing fluid in the well, thereby conveying the diverter plug 42 into engagement with a fluid passageway (such as the perforation 46) in the well; and the particles 56 conforming to a shape of the fluid passageway 46 as the diverter plug 42 blocks fluid flow 44, 52 through the fluid passageway 46, and the particles 56 being prevented from dispersing while the diverter plug 42 blocks the fluid flow 44, 52 through the fluid passageway 46.

In any of the examples described herein, the particles 56 may be grouped together magnetically, the particles 56 may be adhesively grouped together, the particles 56 may be mechanically grouped together, the particles 56 may be adhered to a sheet of material 64, or the particles 56 may be embedded in a deformable material 68.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method, comprising: deploying at least one diverter plug into a well, the diverter plug comprising a group of particles disposed within an outer enclosure, and the diverter plug further comprising at least one enlarged body disposed in the enclosure; flowing fluid in the well, thereby conveying the diverter plug into engagement with a fluid passageway in the well, in which the enlarged body is too large to pass through the fluid passageway; and the particles in the enclosure conforming to a shape of the fluid passageway as the diverter plug blocks fluid flow through the fluid passageway, in which the conforming comprises the particles occupying a space between the enclosure and the enlarged body; in which the enlarged body comprises a knot formed in a line; in which at least one of the group consisting of the line and fibers of the line extends outwardly from the enclosure.

2. A method, comprising: deploying at least one diverter plug into a well, the diverter plug comprising a group of particles disposed within an outer enclosure, and the diverter plug further comprising at least one enlarged body disposed in the enclosure; flowing fluid in the well, thereby conveying the diverter plug into engagement with a fluid passageway in the well, in which the enlarged body is too large to pass through the fluid passageway; and the particles in the enclosure conforming to a shape of the fluid passageway as the diverter plug blocks fluid flow through the fluid passageway, in which the conforming comprises the particles occupying a space between the enclosure and the enlarged body; in which a line extends through the enlarged body; in which at least one of the group consisting of the line and fibers of the line extends outwardly from the enclosure.

3. A method, comprising:
deploying at least one diverter plug into a well, the diverter plug comprising a group of particles disposed within an outer enclosure, and the diverter plug further comprising at least one enlarged body disposed in the enclosure, in which a line extends through the enlarged body, and in which at least one of the group consisting of the line and fibers of the line extends outwardly from the enclosure;

flowing fluid in the well, thereby conveying the diverter plug into engagement with a fluid passageway in the well, in which the enlarged body is too large to pass through the fluid passageway; and the enclosure sealingly engaging the fluid passageway while the particles remain disposed within the enclosure.

4. The method of claim 3, in which the sealingly engaging comprises the particles in the enclosure conforming to a shape of the fluid passageway as the diverter plug blocks fluid flow through the fluid passageway.

5. The method of claim 4, in which the conforming comprises the particles occupying a space between the enclosure and an enlarged body in the enclosure.

6. The method of claim 3, further comprising the particles degrading in the well.

7. The method of claim 3, further comprising the enclosure degrading in the well.

8. The method of claim 3, in which, during the deploying, the particles are loose within the enclosure.

9. The method of claim 3, in which the conveying further comprises producing fluid drag on material extending outwardly from the diverter plug.

10. The method of claim 3, in which the enclosure comprises at least one fabric sheet, and further comprising stitching the particles into the fabric sheet.

11. The method of claim 3, in which the enclosure comprises a flexible sheet material, and further comprising retaining the particles in the flexible sheet material.

12. The method of claim 3, in which the at least one enlarged body comprises multiple enlarged bodies.

13. The method of claim 12, further comprising securing the multiple enlarged bodies to each other in the enclosure.

14. The method of claim 3, in which the enlarged body comprises a knot formed in the line.

* * * * *